(12) United States Patent
Giebel et al.

(10) Patent No.: US 12,521,081 B2
(45) Date of Patent: Jan. 13, 2026

(54) COMPUTED TOMOGRAPHY DEVICE AND METHOD FOR ENERGY TRANSMISSION IN A COMPUTED TOMOGRAPHY DEVICE

(71) Applicant: Siemens Healthcare GmbH, Erlangen (DE)

(72) Inventors: Steffen Giebel, Wiesenthau (DE); Marco Koehler, Adelsdorf (DE); Jens Fehre, Hausen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 111 days.

(21) Appl. No.: 18/457,713

(22) Filed: Aug. 29, 2023

(65) Prior Publication Data
US 2024/0065647 A1    Feb. 29, 2024

(30) Foreign Application Priority Data

Aug. 30, 2022   (EP) .................................... 22192948

(51) Int. Cl.
*A61B 6/03*    (2006.01)
*A61B 6/00*    (2006.01)

(52) U.S. Cl.
CPC ................ *A61B 6/56* (2013.01); *A61B 6/035* (2013.01); *A61B 6/4405* (2013.01)

(58) Field of Classification Search
CPC .......... A61B 6/035; A61B 6/4405; A61B 6/56
See application file for complete search history.

(56) References Cited

U.S. PATENT DOCUMENTS

| | | | |
|---|---|---|---|
| 7,499,524 B2 * | 3/2009 | Anderton | A61B 6/4405 378/102 |
| 8,218,726 B2 | 7/2012 | Bressel | |
| 9,737,273 B2 * | 8/2017 | Gregerson | A61B 6/56 |
| 10,342,506 B2 | 7/2019 | Beyerlein et al. | |
| 10,835,190 B2 * | 11/2020 | Gregerson | A61B 6/035 |
| 10,925,559 B2 * | 2/2021 | Gregerson | A61B 6/56 |
| 11,311,268 B2 * | 4/2022 | Nishijima | G01R 31/382 |
| 11,457,882 B2 * | 10/2022 | Shizukuishi | A61B 6/032 |
| 11,559,270 B2 * | 1/2023 | Gregerson | A61B 6/4405 |
| 11,723,613 B2 * | 8/2023 | Shizukuishi | A61B 6/4435 378/15 |

(Continued)

FOREIGN PATENT DOCUMENTS

| | | | | |
|---|---|---|---|---|
| CN | 110313929 A | * | 10/2019 | |
| CN | 111887879 A | * | 11/2020 | ............. A61B 6/032 |

(Continued)

*Primary Examiner* — Thomas R Artman
(74) *Attorney, Agent, or Firm* — Harness, Dickey & Pierce, P.L.C.

(57) ABSTRACT

A computed tomography device includes a gantry with a supporting gantry part and a rotor. The rotor has a projection data acquisition system and an energy store configured to supply energy to the projection data acquisition system. The rotor is rotatably mounted relative to the supporting gantry part. The gantry has an energy transmission system configured for energy transmission from the supporting gantry part to the energy store of the rotor, wherein the rotor is configured to be at rest relative to the supporting gantry part during the energy transmission from the supporting gantry part to the energy store of the rotor.

19 Claims, 8 Drawing Sheets

(56) References Cited

U.S. PATENT DOCUMENTS

| | | | |
|---|---|---|---|
| 2007/0253540 A1* | 11/2007 | Anderton | A61B 6/4411 |
| | | | 378/198 |
| 2010/0220837 A1* | 9/2010 | Bressel | A61B 6/56 |
| | | | 378/103 |
| 2011/0222667 A1 | 9/2011 | Allen et al. | |
| 2012/0256099 A1* | 10/2012 | Gregerson | A61B 6/4405 |
| | | | 378/4 |
| 2013/0343509 A1 | 12/2013 | Allen et al. | |
| 2014/0275953 A1* | 9/2014 | Gregerson | A61B 6/4405 |
| | | | 600/407 |
| 2017/0007197 A1* | 1/2017 | Beyerlein | A61B 6/542 |
| 2017/0360387 A1* | 12/2017 | Gregerson | H05G 1/10 |
| 2021/0022691 A1* | 1/2021 | Gregerson | A61B 6/035 |
| 2021/0038182 A1* | 2/2021 | Nishijima | A61B 6/54 |
| 2021/0128090 A1* | 5/2021 | Gregerson | A61B 6/4405 |
| 2021/0153825 A1* | 5/2021 | Shizukuishi | A61B 6/56 |
| 2023/0000450 A1* | 1/2023 | Shizukuishi | A61B 6/4435 |
| 2023/0119321 A1* | 4/2023 | Gregerson | A61B 6/4447 |
| | | | 378/197 |
| 2023/0284988 A1* | 9/2023 | Maji | A61B 6/4482 |
| 2024/0065647 A1* | 2/2024 | Giebel | A61B 6/032 |

FOREIGN PATENT DOCUMENTS

| | | |
|---|---|---|
| WO | WO 2011115711 A1 | 9/2011 |
| WO | WO 2014004447 A1 | 1/2014 |

\* cited by examiner

COMPUTED TOMOGRAPHY DEVICE AND METHOD FOR ENERGY TRANSMISSION IN A COMPUTED TOMOGRAPHY DEVICE

CROSS-REFERENCE TO RELATED APPLICATION(S)

The present application claims priority under 35 U.S.C. § 119 to European Patent Application No. 22192948.2, filed Aug. 30, 2022, the entire contents of which are incorporated herein by reference.

BACKGROUND

In an imaging examination by a computed tomography device, a projection data acquisition system is rotated around an examination area to record projection data from the examination area for different projection directions. For this purpose, the projection data acquisition system is integrated into a rotating gantry part of the computed tomography device, which is rotatably mounted relative to a supporting gantry part of the computed tomography device.

In this case, for the electrical supply of energy of the projection data acquisition system and other components of the rotating gantry part, electrical energy is transmitted from the supporting gantry part to the rotating gantry part. A continuous supply of energy can take place, for example via a slip ring arrangement in which resilient sliding contacts are looped along annular sliding tracks and thereby follow a rotational movement of the rotating gantry part relative to the supporting gantry part.

Another possibility for continuously transmitting electrical energy from the supporting gantry part to the rotating gantry part is based on a contactless rotary connection, for example based on inductive, capacitive and/or electromagnetic coupling with at least one annular conductor arrangement.

Annular sliding tracks and/or coupling conductors can limit the flexibility with which installation space in the computed tomography device, in particular on the rotor, is available for other components. The wear of sliding contacts means increased maintenance effort. For contactless rotary connections, the manufacturing costs are relatively high, in particular with regard to the gap dimension between the rotating gantry part and the supporting gantry part in the area of the contactless rotary connection.

U.S. Pat. No. 8,218,726 B2 and U.S. Pat. No. 10,342,506 B2 each disclose a computed tomography device with an energy store.

SUMMARY

An object of one or more embodiments of the present invention is to provide an alternative to customary energy transmission solutions for computed tomography devices.

Embodiments of the present invention relates to a computed tomography device having a gantry with a supporting gantry part and a rotor, the rotor having a projection data acquisition system and an energy store for supplying energy to the projection data acquisition system, and being rotatably mounted relative to the supporting gantry part, the gantry having an energy transmission system which is designed for energy transmission from the supporting gantry part to the energy store of the rotor, the rotor being at rest relative to the supporting gantry part during energy transmission from the supporting gantry part to the energy store of the rotor.

In particular, the gantry of the computed tomography device can have a connection for receiving electrical energy. The electrical energy can be provided, for example, by an electrical energy transmission network, in particular by a low-voltage network of a clinic. The connection for receiving the electrical energy can be configured in particular for detachable connection to the electrical energy transmission network, for example via a connecting cable.

In particular, the energy transmission from the supporting gantry part to the energy store of the rotor can take place in such a way that electrical energy is stored in the energy store of the rotor. The energy store of the rotor can be configured in particular for supplying energy to the projection data acquisition system in such a way that the projection data acquisition system can be supplied with electrical energy from the energy store of the rotor while the rotor rotates relative to the supporting gantry part.

In particular, it can be provided that as a result of the energy transmission from the supporting gantry part to the energy store of the rotor, electrical energy which is required for the acquisition of projection data via the projection data acquisition system for at least one computer tomographic sectional image is transmitted from the supporting gantry part to the energy store of the rotor.

The energy store of the rotor can be based, for example, on an accumulator and/or on capacitors, in particular supercapacitors. Supercapacitors are also known by the terms electrochemical capacitor, ultracapacitor, ultracap and supercap.

The projection data acquisition system may have, for example, an X-ray source and/or an X-ray detector which interacts with the X-ray source and/or be configured to acquire projection data. The acquisition of the projection data via the projection data acquisition system can in particular comprise generating X-rays via the X-ray source and detecting the X-ray rays via the X-ray detector.

A medical imaging device is also disclosed, having a gantry with a supporting gantry part and a movable gantry part, wherein the movable gantry part has a projection data acquisition system and an energy store for supplying energy to the projection data acquisition system and is movably mounted relative to the supporting gantry part, wherein the gantry has an energy transmission system which is configured for energy transmission from the supporting gantry part to the energy store of the movable gantry part, wherein during energy transmission from the supporting gantry part to the energy store of the movable gantry part, the movable gantry part is at rest relative to the supporting gantry part. Furthermore, it can be provided that the energy transmission system is further configured for energy transmission from the energy store of the movable gantry part to the supporting gantry part, wherein during the energy transmission from the energy store of the movable gantry part to the supporting gantry part, the movable gantry part is at rest relative to the supporting gantry part.

For example, the medical imaging device can be a C-arm X-ray device, the movable gantry part being a C-arm of the C-arm X-ray device. In particular, the medical imaging device having suitable features which are described with regard to the rotor of the gantry of the computed tomography device may be further developed by replacing the reference to the rotor of the gantry of the computed tomography device with a reference to the movable gantry part of the medical imaging device.

The computed tomography device can be, in particular, a mobile computed tomography device or a stationary computed tomography device. The computed tomography device can be designed in particular as a head computed tomography device for imaging of the head, for example as a mobile head computed tomography device.

In particular, the gantry may have an opening. The opening can be configured, for example, in such a way that an examination object can be inserted into the opening along a system axis of the gantry for an examination via the computed tomography device. The examination object may be, for example, a human being, an animal or a phantom. In particular, the rotor can be mounted rotatably about an axis of rotation relative to the supporting gantry part. The axis of rotation can, for example, be equal to the system axis.

The computed tomography device can thus be operated in such a way that energy transmission between the rotor and the supporting gantry part takes place only in an idle state of the rotor relative to the supporting gantry part, in particular between two operating states of the computed tomography device in which the rotor rotates relative to the supporting gantry part. Thus, continuous energy transmission during rotation of the rotor relative to the supporting gantry part is not required. It is therefore possible to dispense with annular sliding tracks and coupling conductors. Compared to conventional ring-based energy transmission solutions for computed tomography devices, the outlay for production and maintenance can thus be reduced and the installation space in the computed tomography device can be used more flexibly. Furthermore, the material costs and weight of the computed tomography device can be reduced in this way.

One embodiment provides that the energy transmission system is further configured for energy transmission from the energy store of the rotor to the supporting gantry part, the rotor being at rest relative to the supporting gantry part during the transmission of energy from the energy store of the rotor to the supporting gantry part. For example, the energy store of the rotor can be used to supply energy to the entire computed tomography device while the rotor is at rest relative to the supporting gantry part.

One embodiment provides that the gantry has a chassis which is configured for a travel movement of the gantry relative to a base area, the energy transmission from the energy store of the rotor to the supporting gantry part taking place during the travel movement of the gantry.

The base area may be, for example, the floor of an examination room and/or be formed by a floor covering and/or a substrate. In particular, the chassis can be configured to move the gantry parallel to the base area relative to the base area.

The chassis can, for example, be based on wheels and/or be omnidirectional. In particular, the travel movement of the gantry can take place while the rotor is at rest relative to the supporting gantry part. The travel movement of the gantry can take place, for example, in order to move the gantry within an examination room and/or between different examination rooms of a clinic. The travel movement of the gantry can take place, in particular, while the gantry is disconnected from an electrical energy transmission network, in particular from a low-voltage network of a clinic.

One embodiment provides that the supporting gantry part has an electric travel drive which interacts with the chassis, the energy transmission from the energy store of the rotor to the supporting gantry part taking place via the energy transmission system from the energy store of the rotor to the electric travel drive in order to drive the travel movement of the gantry via the travel drive.

If the electrical energy for the travel movement of the gantry is taken from the energy store of the rotor, no electrical energy for the travel movement of the gantry needs to be stored on the supporting gantry part. Thus, installation space and costs for an energy store designed for supplying energy to the chassis can be saved on the supporting gantry part. Redundancies in the energy store capacities can be saved if both the energy of the chassis and the energy of the projection data acquisition system are supplied via the energy store of the rotor.

One embodiment provides that the supporting gantry part has an energy store, the energy transmission from the supporting gantry part to the energy store of the rotor taking place via the energy transmission system from the energy store of the supporting gantry part to the energy store of the rotor and/or the energy transmission from the energy store of the rotor to the supporting gantry part taking place via the energy transmission system from the energy store of the rotor to the energy store of the supporting gantry part.

In particular, it can be provided that the energy transmission from the energy store of the supporting gantry part to the energy store of the rotor takes place during the travel movement of the gantry. The energy store of the supporting gantry part can be used for supplying energy to components of the supporting gantry part while the rotor rotates relative to the supporting gantry part and/or while the energy store of the rotor is not connected to the supporting gantry part via the energy transmission system.

The chassis can be configured, for example, for a scanning movement of the gantry relative to the examination object during the acquisition of the projection data. In particular, the examination object can be at rest relative to the base area. The scanning movement of the gantry can take place in particular along the system axis of the gantry. The scanning movement can be driven, for example, based on electrical energy from the energy store of the supporting gantry part.

The gantry, in particular the energy transmission system of the gantry, can have a switching apparatus, for example. The switching apparatus can be configured, for example, to distribute electrical energy to the energy store of the supporting gantry part and the energy store of the rotor. The switching apparatus can be used, for example, for switching the computed tomography device into different operating states which differ from one another with regard to the flow of electrical energy.

Furthermore, it can be provided that the supporting gantry part has a data processing system, wherein the energy store of the supporting gantry part is configured for the supply of energy to the data processing system, wherein the supply of energy to the data processing system takes place with electrical energy from the energy store of the supporting gantry part, in particular while the rotor rotates relative to the supporting gantry part.

The data processing system can be configured, for example, to control the computed tomography device and/or for image processing the projection data.

One embodiment provides that the supporting gantry part has a first connecting element of the energy transmission system, that the rotor has a second connecting element of the energy transmission system and that the first connecting element and the second connecting element are aligned correspondingly to one another for establishing an energy transmission connection. In particular, it can be provided that the first connecting element and the second connecting element are aligned correspondingly to one another for establishing the energy transmission connection when the rotor is in a coupling angular position relative to the supporting gantry part.

In particular, it can be provided that the gantry has an angular positioning apparatus, wherein the angular positioning apparatus is configured for angular positioning of the rotor in the coupling angular position relative to the supporting gantry part.

In particular, it can be provided that the energy transmission from the supporting gantry part to the energy store of the rotor takes place via the energy transmission connection and/or that the energy transmission from the energy store of the rotor to the supporting gantry part takes place via the energy transmission connection. In particular, the energy transmission connection can be bidirectional.

In particular, it can be provided that during the energy transmission from the supporting gantry part to the energy store of the rotor, the rotor is at rest relative to the supporting gantry part and is in the coupling angular position relative to the supporting gantry part and/or that during the energy transmission from the energy store of the rotor to the supporting gantry part, the rotor is at rest relative to the supporting gantry part and is in the coupling angular position relative to the supporting gantry part.

The coupling angular position can be related, for example, to the axis of rotation about which the rotor is rotatably mounted relative to the supporting gantry part. The coupling angular position can be, for example, that angular position of the rotor relative to the supporting gantry part in which a distance between the first connecting element and the second connecting element is minimal in comparison to other angular positions of the rotor relative to the supporting gantry part, which are traversed during a rotation of the rotor relative to the supporting gantry part.

In particular, it can be provided that the gantry has an angular positioning apparatus, the angular positioning apparatus being configured for angular positioning of the rotor in the coupling angular position relative to the supporting gantry part.

The angular positioning of the rotor can take place, for example, based on a braking of a rotational movement of the rotor relative to the supporting gantry part via a brake in such a way that the rotational movement of the rotor ends in the coupling angular position relative to the supporting gantry part. The angular positioning apparatus may comprise the brake, for example. The angular positioning apparatus may be configured, for example, to drive an angular positioning rotational movement of the rotor relative to the supporting gantry part. The braking of the rotational movement of the rotor, in particular the angular positioning rotational movement of the rotor, and/or the driving of the rotational movement of the rotor, in particular the angular positioning rotational movement of the rotor, can be carried out, for example, with electrical energy from the energy store of the rotor and/or with electrical energy from the energy store of the supporting gantry part.

The angular positioning apparatus may comprise, for example, a fixing apparatus which is configured to fix the rotor relative to the supporting gantry part in the coupling angular position relative to the supporting gantry part.

The angular positioning apparatus may comprise, for example, a sprung bolt on the supporting gantry part and a hole on the rotor, which are designed and arranged in such a way that the bolt can engage in the hole when the rotor is in the coupling angular position relative to the supporting gantry part and thus fix the rotor in the coupling angular position relative to the supporting gantry part.

One embodiment provides that the energy transmission connection is an electrical plug connection of the first connecting element and the second connecting element to one another.

One embodiment provides that the energy transmission connection is configured for contactless electrical energy transmission between the first connecting element and the second connecting element, for example for contactless inductive electrical energy transmission between the first connecting element and the second connecting element and/or for contactless capacitive electrical energy transmission between the first connecting element and the second connecting element.

In particular, it can be provided that the energy transmission from the supporting gantry part to the energy store of the rotor comprises the contactless electrical energy transmission between the first connecting element and the second connecting element and/or that the energy transmission from the energy store of the rotor to the supporting gantry part comprises the contactless electrical energy transmission between the first connecting element and the second connecting element.

The contactless electrical energy transmission between the first connecting element and the second connecting element can be realized in low-wear manner and/or used for galvanic isolation of the rotor from the supporting gantry part.

Furthermore, it can be provided that the contactless electrical energy transmission between the first connecting element and the second connecting element can also take place while the rotor rotates relative to the supporting gantry part.

One embodiment provides that the gantry has a coupling apparatus which is configured for arranging the first connecting element and the second connecting element in a coupling position relative to one another while the rotor is at rest relative to the supporting gantry part, in particular while the rotor is at rest in the coupling angular position relative to the supporting gantry part, and for arranging the first connecting element and the second connecting element in a decoupling position relative to one another while the rotor is at rest relative to the supporting gantry part, in particular while the rotor is at rest in the coupling angular position relative to the supporting gantry part.

In particular, it can be provided that the energy transmission connection is established by coupling the first connecting element and the second connecting element to one another when the rotor is in the coupling angular position relative to the supporting gantry part and when the first connecting element and the second connecting element are arranged in the coupling position relative to one another. The coupling of the first connecting element and of the second connecting element to one another can be inductive and/or capacitive, for example, or can be based on an electrical contact, for example, a sprung and/or plugged electrical contact, of the first connecting element and the second connecting element.

In particular, it can be provided that the energy transmission connection is interrupted by a decoupling of the first connecting element and the second connecting element from one another when the first connecting element and the second connecting element are arranged in the decoupling position relative to one another.

The coupling can be, for example, electrical and/or mechanical. The decoupling can be, for example, electrical and/or mechanical. The decoupling of the first connecting element and the second connecting element from one another can take place, for example, by opening and/or enlarging a gap between the first connecting element and the second connecting element. By opening and/or enlarging the gap, for example, a rotation of the rotor relative to the supporting gantry part can be made possible without the rotation of the rotor being prevented and/or disturbed by the coupling of the first connecting element and the second connecting element to one another.

If the energy transmission connection is an electrical plug connection of the first connecting element and the second connecting element, decoupling of the first connecting element and of the second connecting element from one another can take place by releasing the plug connection.

The arrangement of the first connecting element and the second connecting element in the coupling position relative to one another and/or the arrangement of the first connecting element and the second connecting element in the decoupling position relative to one another can be carried out, for example, with electrical energy from the energy store of the rotor and/or with electrical energy from the energy store of the supporting gantry part.

Embodiments of the present invention further relate to a method for energy transmission in a computed tomography device, wherein the computed tomography device has a gantry with a supporting gantry part, a rotor and an energy transmission system, wherein the rotor comprises the projection data acquisition system and an energy store and is rotatably mounted relative to the supporting gantry part, the method comprising:

causing an idle state of the rotor relative to the supporting gantry part in such a way that the rotor is at rest relative to the supporting gantry part,
  carrying out energy transmission from the supporting gantry part to the energy store of the rotor via the energy transmission system while the rotor is at rest relative to the supporting gantry part,
  rotating the rotor relative to the supporting gantry part,
  supplying the projection data acquisition system with electrical energy from the energy store of the rotor during rotation of the rotor relative to the supporting gantry part.

In particular, the energy transmission from the supporting gantry part to the energy store of the rotor can be carried out in such a way that electrical energy is stored in the energy store of the rotor.

One embodiment provides that a travel movement of the gantry relative to a base area is carried out via a chassis, wherein the energy transmission from the energy store of the rotor to the supporting gantry part is carried out during the travel movement of the gantry.

One embodiment provides that as a result of the energy transmission from the energy store of the rotor to the supporting gantry part via the energy transmission system, electrical energy for an electric travel drive which interacts with the chassis is transmitted from the energy store of the rotor to the supporting gantry part. In particular, the travel movement of the gantry can be driven via the electric travel drive based on the electrical energy for the electric travel drive.

One embodiment provides that the supporting gantry part has an energy store, wherein the energy transmission from the supporting gantry part to the energy store of the rotor is carried out via the energy transmission system from the energy store of the supporting gantry part to the energy store of the rotor and/or wherein the energy transmission from the energy store of the rotor to the supporting gantry part is carried out via the energy transmission system from the energy store of the rotor to the energy store of the supporting gantry part.

One embodiment provides that the supporting gantry part comprises a first connecting element of the energy transmission system, the rotor comprising a second connecting element of the energy transmission system, the first connecting element and the second connecting element being aligned correspondingly to one another for establishing an energy transmission connection. In particular, the rotor can be angularly positioned in a coupling angular position relative to the supporting gantry part, in particular via an angular positioning apparatus in such a way that the first connecting element and the second connecting element are aligned correspondingly to one another for establishing the energy transmission connection.

One embodiment provides that the energy transmission connection is established by coupling the first connecting element and the second connecting element to one another, for example by arranging the first connecting element and the second connecting element in a coupling position relative to one another, in particular via a coupling apparatus in the coupling position relative to one another, while the rotor is at rest relative to the supporting gantry part and is in the coupling angular position relative to the supporting gantry part.

In particular, it can be provided that the energy transmission connection is interrupted by decoupling the first connecting element and the second connecting element from one another, for example by arranging the first connecting element and the second connecting element in a decoupling position relative to one another, in particular via the coupling apparatus in the decoupling position relative to one another, while the rotor is at rest relative to the supporting gantry part and is in the coupling angular position relative to the supporting gantry part.

Within the scope of the present invention, features which are described with regard to different embodiments of the present invention and/or different categories of claims (method, use, apparatus, system, arrangement, etc.) can be combined to form further embodiments of the present invention. For example, a claim relating to an apparatus can also be developed with features which are described or claimed in connection with a method, and vice versa. Functional features of a method can be implemented in this case by correspondingly designed components of the subject matter. The use of the indefinite articles "a" or "an" does not preclude the feature concerned also being present several times.

BRIEF DESCRIPTION OF THE DRAWINGS

The present invention is explained hereinafter on the basis of exemplary embodiments with reference to the accompanying figures. The view in the figures is diagrammatic, greatly simplified and not necessarily true to scale.

DETAILED DESCRIPTION

Figure 1:
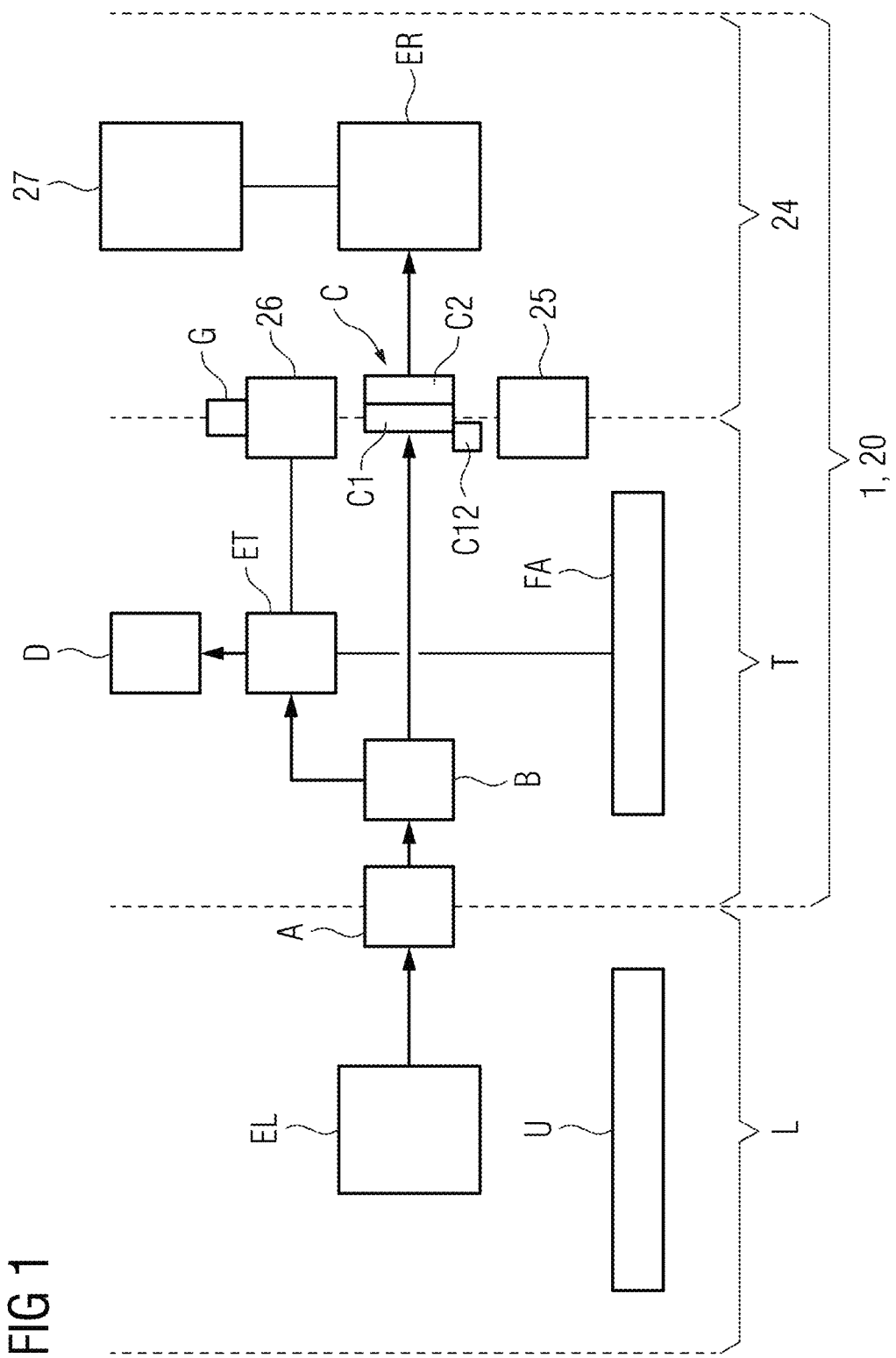
FIG. 1 shows an energy flow chart for a first operating state of the computed tomography device.

FIG. 1 shows an energy flow chart for a first operating state of the computed tomography device 1. The computed tomography device 1 has a gantry 20 with a supporting gantry part T and a rotor 24, wherein the rotor 24 has a projection data acquisition system 27 and an energy store ER for supplying energy to the projection data acquisition system 27 and is rotatably mounted relative to the supporting gantry part T, wherein the gantry 20 has an energy transmission system C which is set up for energy transmission from the supporting gantry part T to the energy store ER of the rotor 24, wherein during the energy transmission from the supporting gantry part T to the energy store ER of the rotor 24, the rotor 24 is at rest relative to the supporting gantry part T.

In the first operating state of the computed tomography device 1, the rotor 24 is at rest relative to the supporting gantry part T, the energy transmission connection of the energy transmission system C being established between the energy store ER of the rotor 24 and the supporting gantry part T.

The gantry 20 of the computed tomography device 1 has a connection A for receiving electrical energy. An electrical energy transmission network EL, for example, a low-voltage network of a clinic, supplies the electrical energy. In the first operating state of the computed tomography device 1, the connection A is detachably connected to the electrical energy transmission network EL via a connecting cable.

The supporting gantry part T comprises an energy store ET, the energy transmission from the supporting gantry part T to the energy store ER of the rotor 24 taking place via the energy transmission system C from the energy store ET of the supporting gantry part T to the energy store ER of the rotor 24 and/or the energy transmission from the energy store ER of the rotor 24 to the supporting gantry part T taking place via the energy transmission system C from the energy store ER of the rotor 24 to the energy store ET of the supporting gantry part T.

The supporting gantry part T comprises a data processing system D, the energy store ET of the supporting gantry part T being configured for supplying energy to the data processing systems D, the supply of energy of the data processing system D taking place with electrical energy from the energy store ET of the supporting gantry part T, in particular while the rotor 24 rotates relative to the supporting gantry part T.

The energy transmission system C has the switching apparatus B. The electrical energy received from the electrical energy transmission network EL is distributed via the switching apparatus B to the energy store ET of the supporting gantry part T and the energy store ER of the rotor 24. In the first operating state of the computed tomography device 1, electrical energy is thus stored both in the energy store ET of the supporting gantry part T and in the energy store ER of the rotor 24.

The supporting gantry part T has a first connecting element C1 of the energy transmission system C. The rotor 24 has a second connecting element C2 of the energy transmission system C. The first connecting element C1 and the second connecting element C2 are configured to correspond to one another for establishing an energy transmission connection. The first connecting element C1 and the second connecting element C2 are correspondingly aligned to one another for establishing the energy transmission connection when the rotor 24 is in a coupling angular position relative to the supporting gantry part T.

The gantry 20 has the angular positioning apparatus G, the angular positioning apparatus G being configured for angular positioning of the rotor 24 in the coupling angular position relative to the supporting gantry part T.

The energy transmission connection can be, for example, an electrical plug connection of the first connecting element C1 and the second connecting element C2 to one another. Alternatively, the energy transmission connection can be configured, for example, for contactless electrical energy transmission between the first connecting element C1 and the second connecting element C2.

The gantry 20 has a coupling apparatus C12 which is configured to arrange the first connecting element C1 and the second connecting element C2 in a coupling position relative to one another while the rotor 24 is at rest relative to the supporting gantry part T, and to arrange the first connecting element C1 and the second connecting element C2 in a decoupling position relative to one another while the rotor 24 is at rest relative to the supporting gantry part T.

The energy transmission connection is produced by coupling the first connecting element C1 and the second connecting element C2 to one another when the rotor 24 is in the coupling angular position relative to the supporting gantry part T and when the first connecting element C1 and the second connecting element C2 are arranged in the coupling position relative to one another.

The energy transmission connection is interrupted by a decoupling of the first connecting element C1 and the second connecting element C2 from one another when the first connecting element C1 and the second connecting element C2 are arranged in the decoupling position relative to one another.

In the first operating state of the computed tomography device 1, the energy transmission connection is established by coupling the first connecting element C1 and the second connecting element C2 to one another by arranging the first connecting element C1 and the second connecting element C2 in a coupling position relative to one another via the coupling apparatus C12. The rotor 24 is at rest relative to the supporting gantry part T and is in the coupling angular position relative to the supporting gantry part T.

Figure 2:
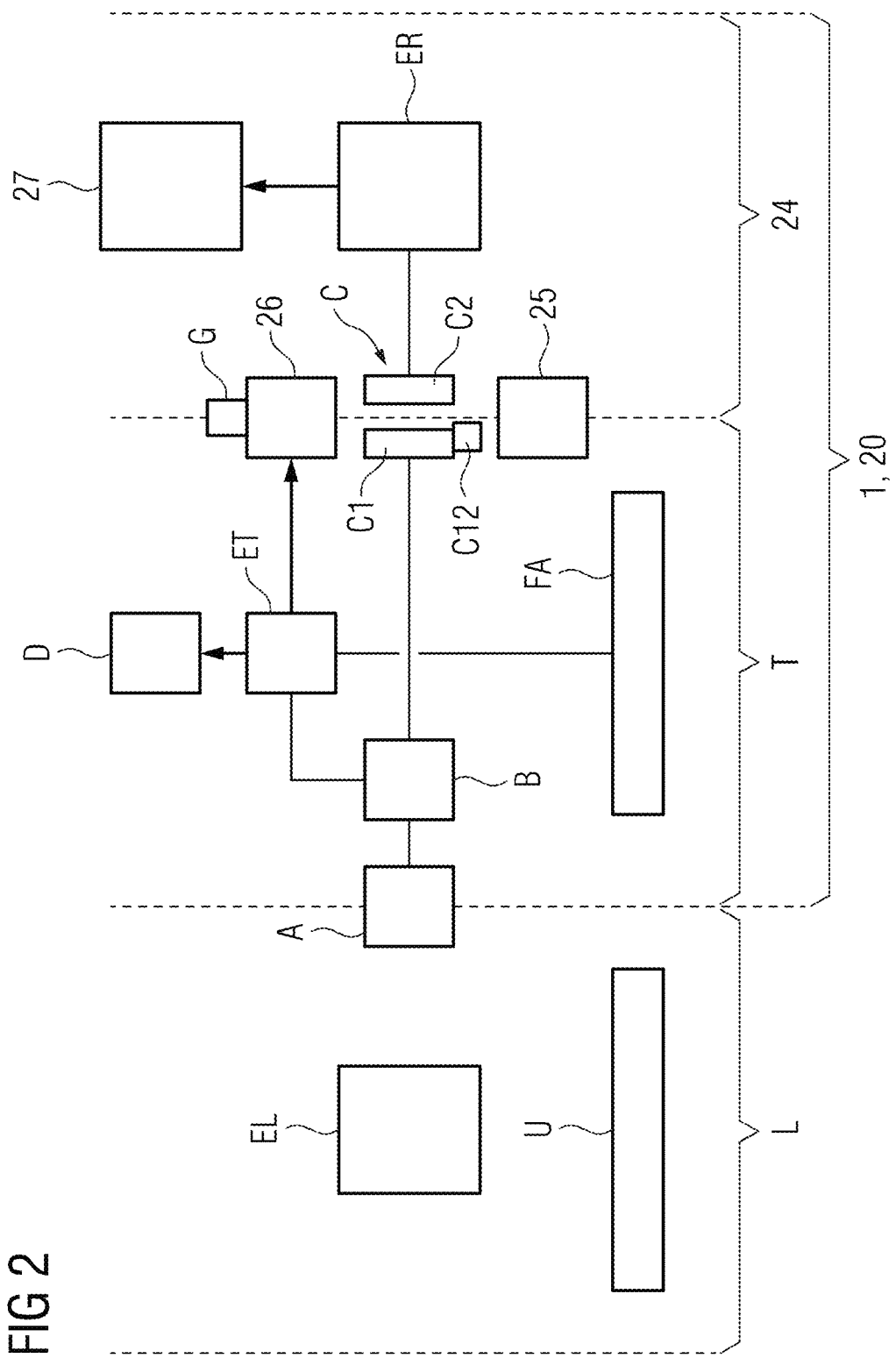
FIG. 2 shows an energy flow chart for a second operating state of the computed tomography device.

FIG. 2 shows an energy flow chart for a second operating state of the computed tomography device 1. In the second operating state of the computed tomography device 1, the rotor 24 rotates relative to the supporting gantry part T, the energy transmission connection of the energy transmission system C being interrupted between the energy store ER of the rotor 24 and the supporting gantry part T. In the second operating state of the computed tomography device 1, the connection A is not connected to the electrical energy transmission network EL.

Projection data is acquired via the projection data acquisition system 27, the projection data acquisition system 27 being supplied with electrical energy from the energy store ER of the rotor 24. The gantry 20 has the rotary drive 26 for driving the rotational movement of the rotor 24 relative to the supporting gantry part T about the axis of rotation SA, the rotary drive 26 being supplied with electrical energy from the energy store ET of the supporting gantry part T.

During the transition from the first operating state of the computed tomography device 1 to the second operating state of the computed tomography device 1, the energy transmission connection is interrupted by decoupling the first connecting element C1 and the second connecting element C2 from one another by arranging the first connecting element C1 and the second connecting element C2 in a decoupling position relative to one another via the coupling apparatus C12, while the rotor 24 is at rest relative to the supporting gantry part T and is located in the coupling angular position relative to the supporting gantry part T.

Figure 3:
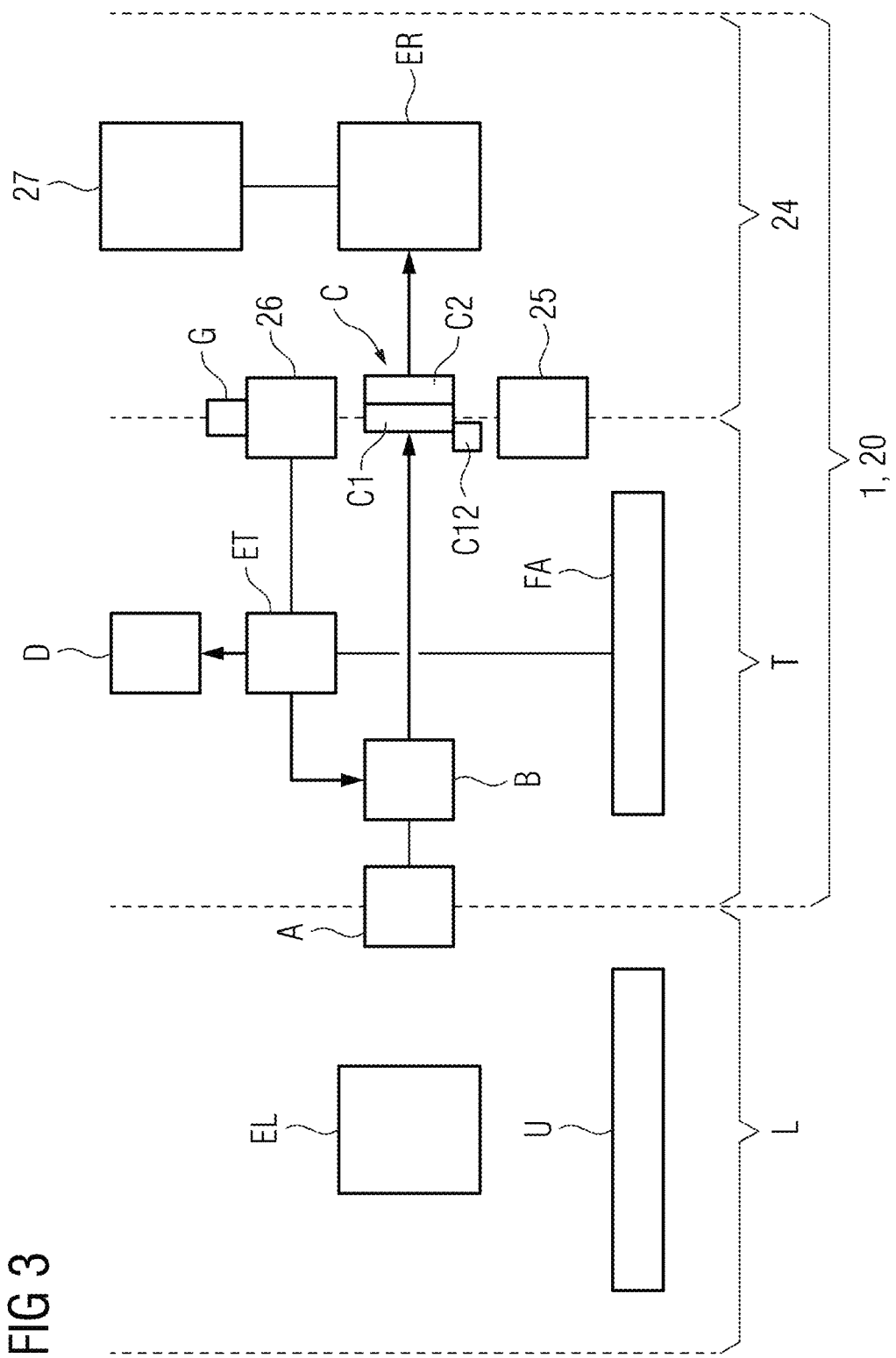
FIG. 3 shows an energy flow chart for a third operating state of the computed tomography device.

FIG. 3 shows an energy flow chart for a third operating state of the computed tomography device 1. In the third operating state of the computed tomography device 1, the rotor 24 is at rest relative to the supporting gantry part T, the energy transmission connection of the energy transmission system C being established between the energy store ER of the rotor 24 and the supporting gantry part T. In the second operating state of the computed tomography device 1, the connection A is not connected to the electrical energy transmission network EL.

For example, after single or multiple acquisition of projection data which has been carried out in the second operating state of the computed tomography device 1, the energy store ER of the rotor 24 can be charged in this way with electrical energy from the energy store ET of the supporting gantry part T.

During the transition from the second operating state of the computed tomography device 1 to the third operating state of the computed tomography device 1, the rotor 24 is angularly positioned in the coupling angular position relative to the supporting gantry part T via the angular positioning apparatus G in such a way that the first connecting element C1 and the second connecting element C2 are aligned correspondingly to one another for establishing the energy transmission connection.

During the transition from the second operating state of the computed tomography device 1 to the third operating state of the computed tomography device 1, the energy transmission connection is established by coupling the first connecting element C1 and the second connecting element C2 to one another by arranging the first connecting element C1 and the second connecting element C2 in the coupling position relative to one another via the coupling apparatus C12 while the rotor 24 is at rest relative to the supporting gantry part T and is in the coupling angular position relative to the supporting gantry part T.

Figure 4:
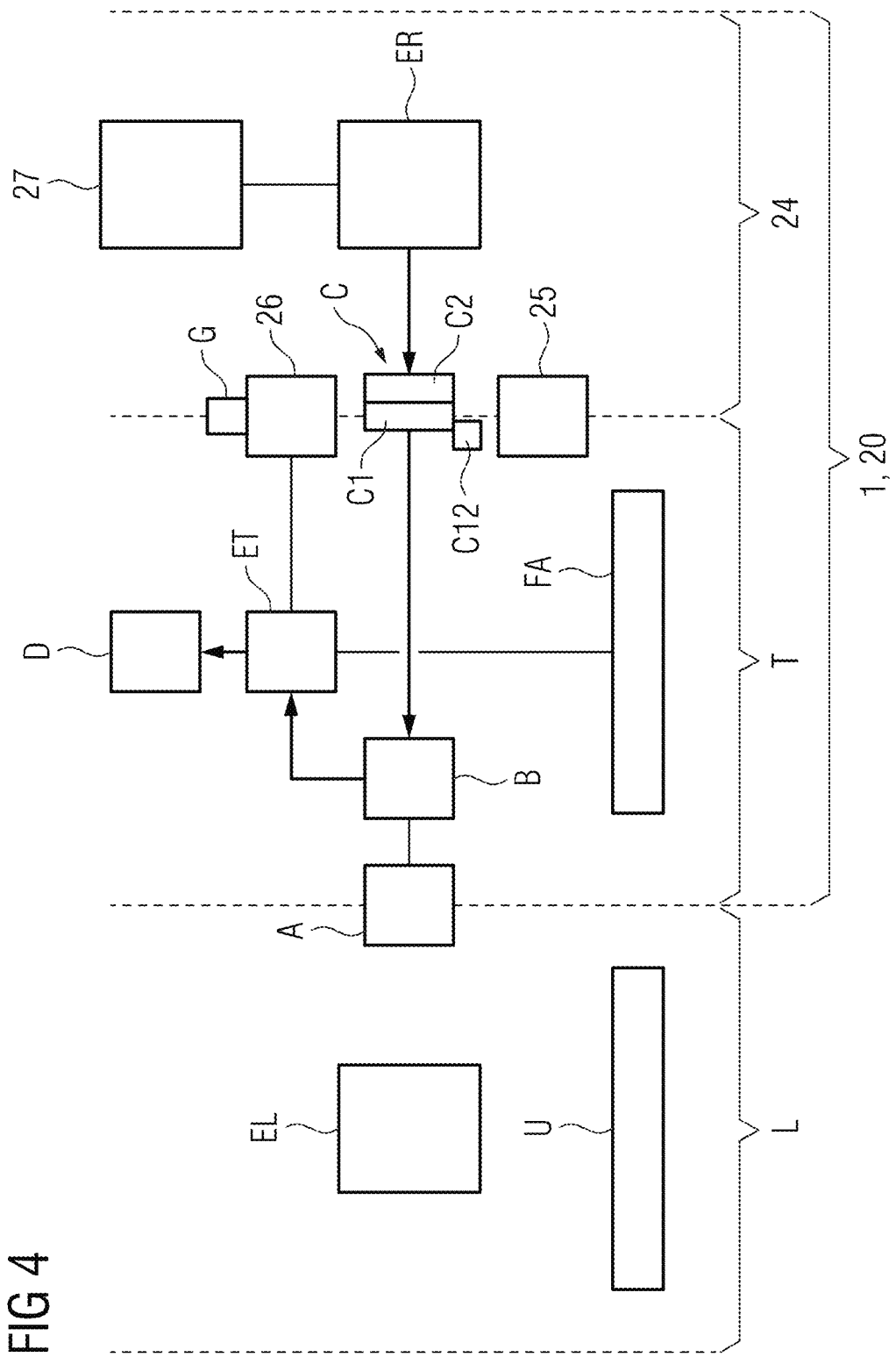
FIG. 4 shows an energy flow chart for a fourth operating state of the computed tomography device.

FIG. 4 shows an energy flow chart for a fourth operating state of the computed tomography device 1. In the third operating state of the computed tomography device 1, the rotor 24 is at rest relative to the supporting gantry part T, the energy transmission connection of the energy transmission system C being established between the energy store ER of the rotor 24 and the supporting gantry part T. In the second operating state of the computed tomography device 1, the connection A is not connected to the electrical energy transmission network EL. The energy transmission system C is configured for energy transmission from the energy store ER of the rotor 24 to the supporting gantry part T, the rotor 24 being at rest relative to the supporting gantry part T during the energy transmission from the energy store ER of the rotor 24 to the supporting gantry part T.

Figure 5:
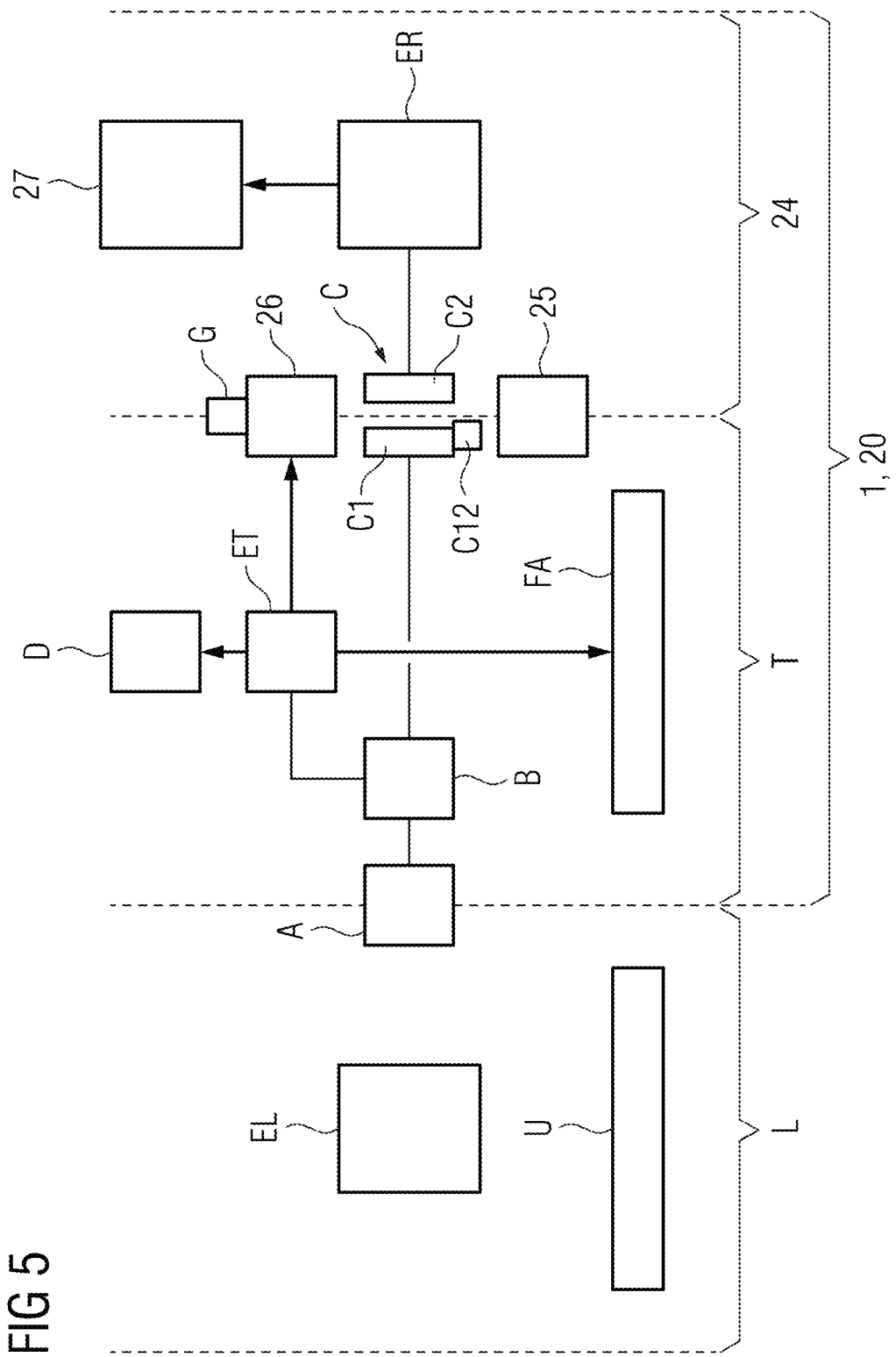
FIG. 5 shows an energy flow chart for a fifth operating state of the computed tomography device.

FIG. 5 shows an energy flow chart for a fifth operating state of the computed tomography device 1. In the fifth operating state of the computed tomography device 1, the rotor 24 rotates relative to the supporting gantry part T, the energy transmission connection of the energy transmission system C being interrupted between the energy store ER of the rotor 24 and the supporting gantry part T. In the second operating state of the computed tomography device 1, the connection A is not connected to the electrical energy transmission network EL.

Projection data is acquired via the projection data acquisition system 27, the projection data acquisition system 27 being supplied with electrical energy from the energy store ER of the rotor 24. The gantry 20 has the rotary drive 26 for driving the rotational movement of the rotor 24 relative to the supporting gantry part T about the axis of rotation SA, the rotary drive 26 being supplied with electrical energy from the energy store ET of the supporting gantry part T.

The gantry 20 has the chassis FW, which is configured for a scanning movement of the gantry 20 relative to the base area U. The supporting gantry part T has an electric travel drive FA which interacts with the chassis FW. In the fifth operating state of the computed tomography device 1, during the acquisition of the projection data, the scanning movement of the gantry 20 relative to the base area U is driven based on electrical energy from the energy store ET of the supporting gantry part T via the travel drive FA.

Figure 6:
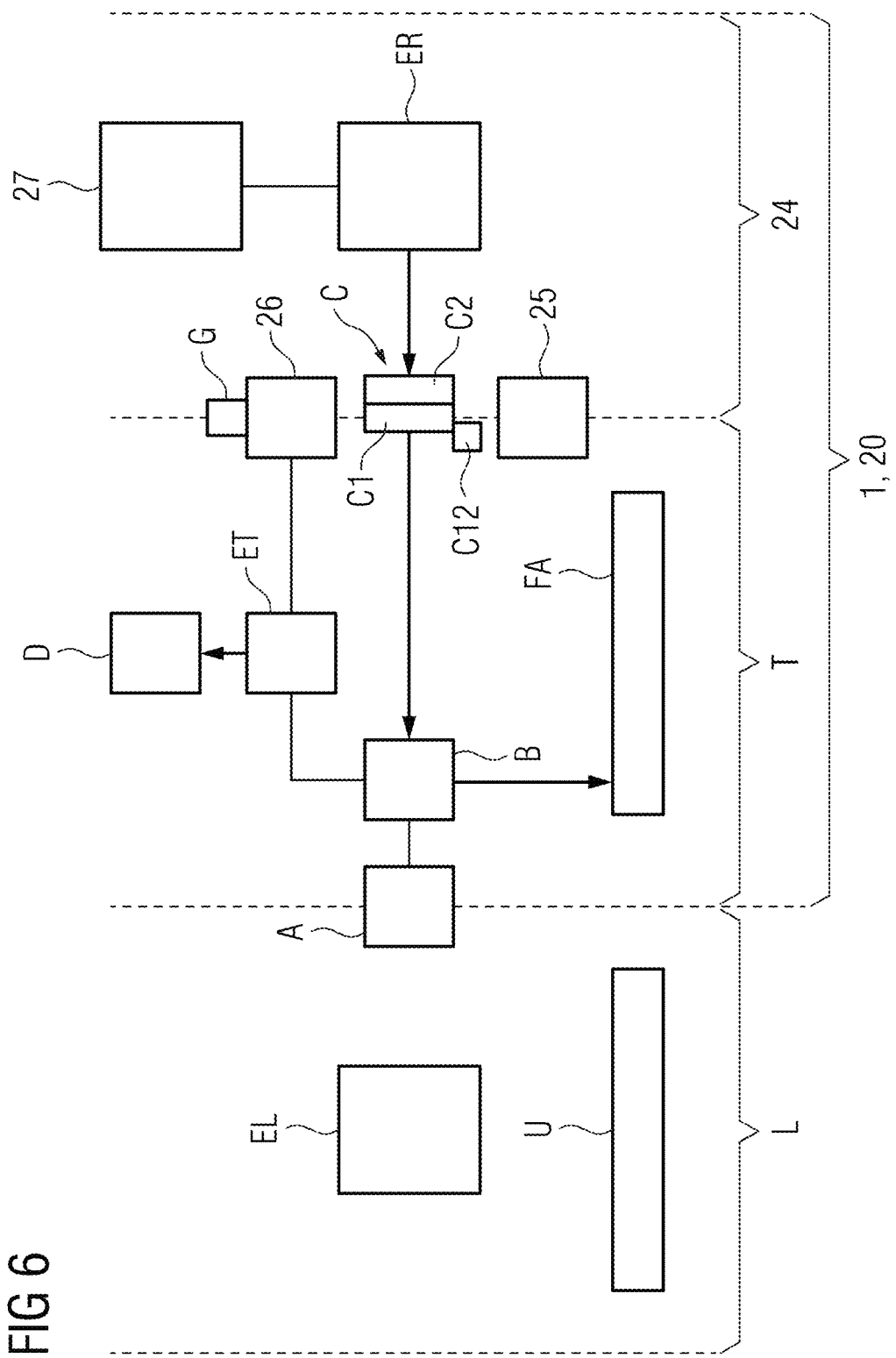
FIG. 6 shows an energy flow chart for an operating state of a computed tomography device according to a further example.

FIG. 6 shows an energy flow chart for an operating state of a computed tomography device 1 according to a further example. In this operating state of the computed tomography device 1, the rotor 24 is at rest relative to the supporting gantry part T, the energy transmission connection of the energy transmission system C being produced between the energy store ER of the rotor 24 and the supporting gantry part T and the connection A not being connected to the electrical energy transmission network EL.

The gantry 20 comprises the chassis FW, which is configured for a travel movement of the gantry 20 relative to the base area U. The supporting gantry part T comprises an electric travel drive FA which interacts with the chassis FW. In the operating state of the computed tomography device 1 according to FIG. 6, a travel movement of the gantry 20 relative to the base area U is carried out via the chassis FW. The energy transmission from the energy store ER of the rotor 24 to the supporting gantry part T takes place during the travel movement of the gantry 20. The energy transmission from the energy store ER of the rotor 24 to the supporting gantry part T takes place via the energy transmission system C from the energy store ER of the rotor 24 to the electric travel drive FA in order to drive the travel movement of the gantry 20 via the travel drive FA.

As a result of the energy transmission from the energy store ER of the rotor 24 to the supporting gantry part T via the energy transmission system C, electrical energy for the electric travel drive FA is thus transmitted from the energy store ER of the rotor 24 to the supporting gantry part T, which interacts with the chassis FW, the travel movement of the gantry 20 being driven via the electric travel drive FA based on the electrical energy for the electric travel drive FA.

Figure 7:
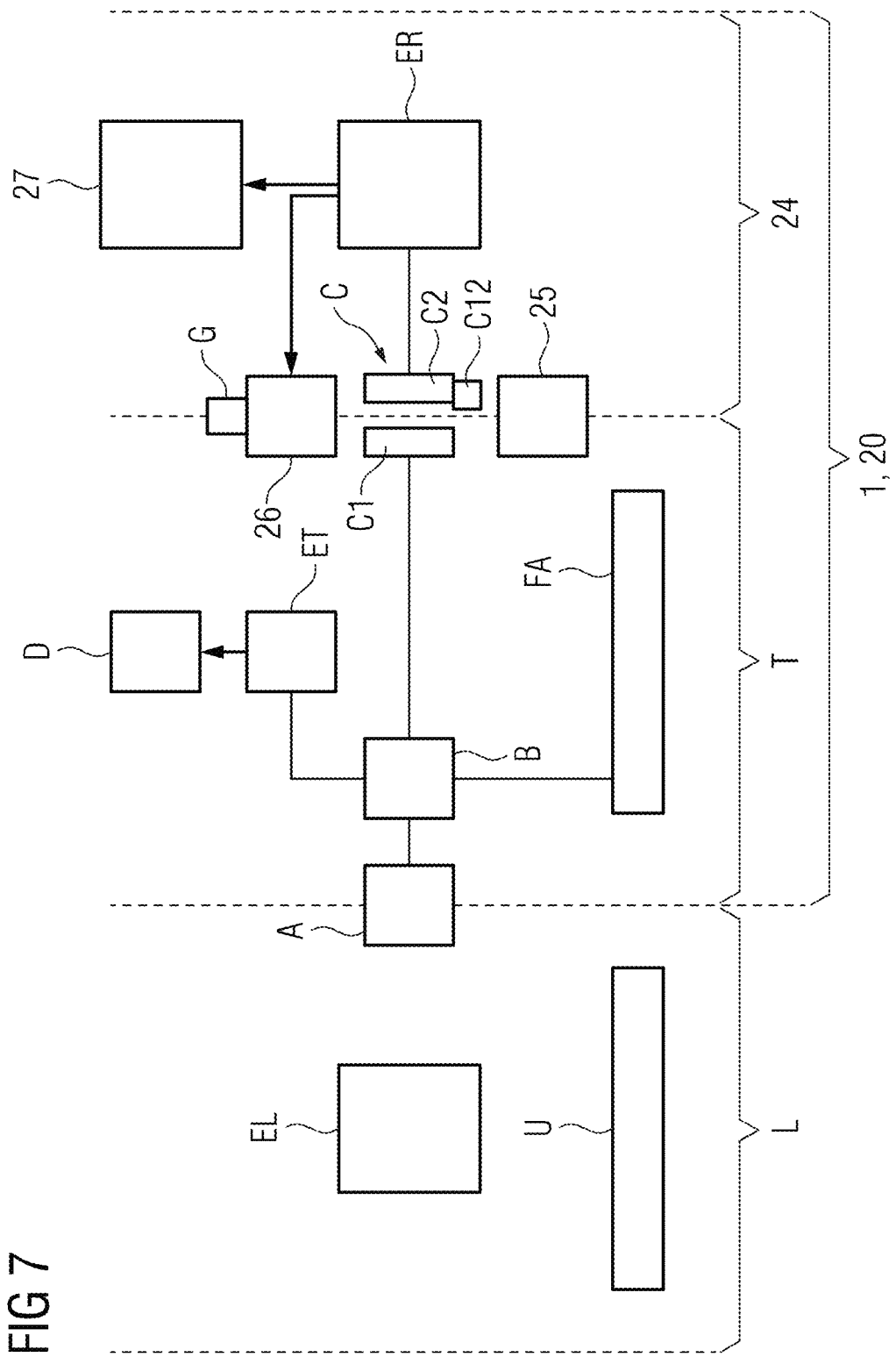
FIG. 7 shows an energy flow chart for an operating state of a computed tomography device according to a further example.

FIG. 7 shows an energy flow chart for an operating state of a computed tomography device 1 according to another example. In this operating state of the computed tomography device 1, the rotor 24 rotates relative to the supporting gantry part T, the energy transmission connection of the energy transmission system C being interrupted between the energy store ER of the rotor 24 and the supporting gantry part T, and the connection A not being connected to the electrical energy transmission network EL.

Projection data is acquired via the projection data acquisition system 27, the projection data acquisition system 27 being supplied with electrical energy from the energy store ER of the rotor 24. The gantry 20 has the rotary drive 26 for driving the rotational movement of the rotor 24 relative to the supporting gantry part T about the axis of rotation SA, the rotary drive 26 being supplied with electrical energy from the energy store ER of the rotor 24.

Figure 8:
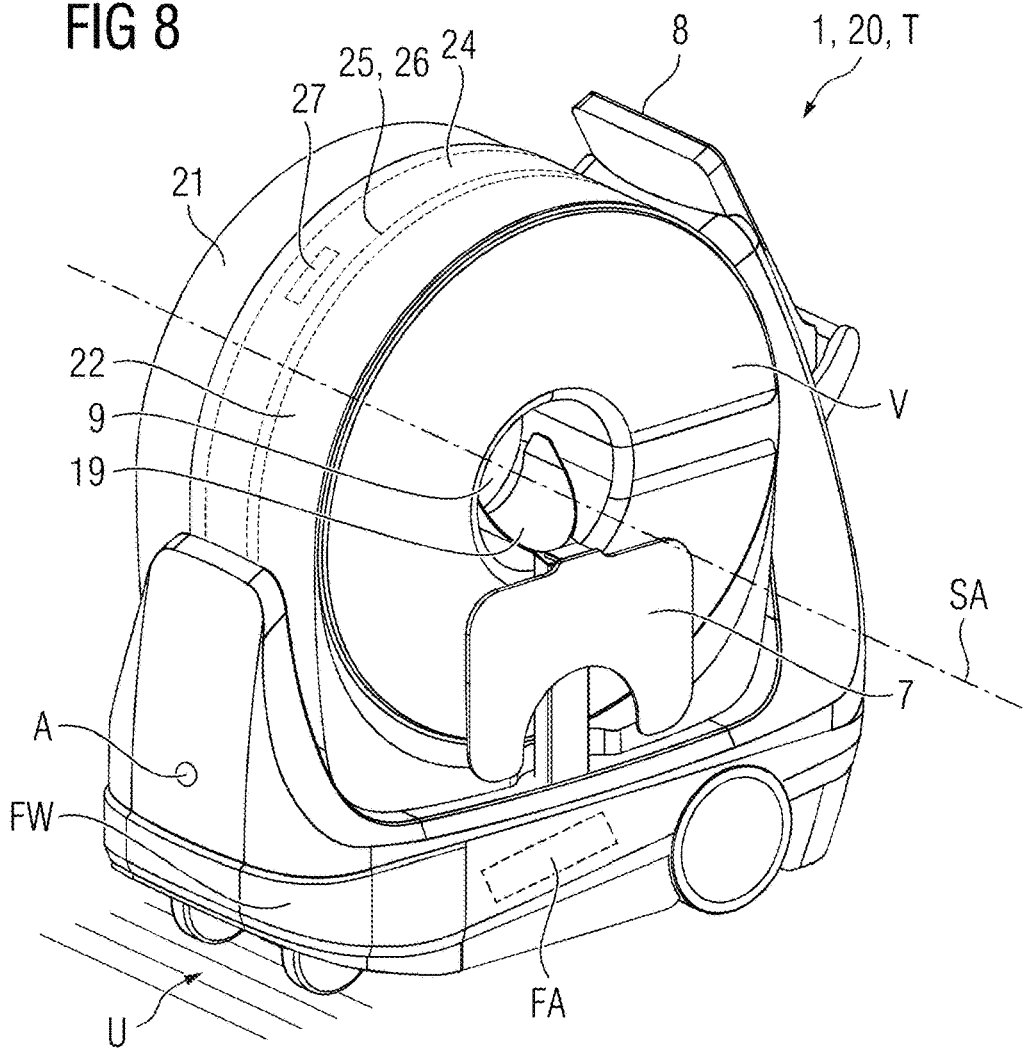
FIG. 8 shows an example of a computed tomography device.

FIG. 8 shows an example of a computed tomography device 1 with the gantry 20. The gantry 20 comprises a first gantry part 21 and a second gantry part 22, the first gantry part 21 comprising the rotatably mounted rotor 24 with the projection data acquisition system 27, the second gantry part 22 comprising at least one portion of the opening 9. The first gantry part 21 comprises the rotary bearing 25 and a support structure 26, the rotor 24 being connected to the support structure 26 via the rotary bearing 25 and being rotatably mounted about the axis of rotation SA relative to the support structure 26, the axis of rotation SA being a system axis of the gantry 20. The first gantry part 21 is mounted so as to be rotatable relative to the second gantry part 22 in such a way that a translational movement of the first gantry part 21 relative to the second gantry part 22 can be carried out along the system axis of the gantry 20, while at the same time the second gantry part 22 is at rest relative to the head shell 19 and relative to the at least one portion of the opening 9.

The supporting gantry part T may comprise, for example, the second gantry part 22 and the support structure 26 of the first gantry part 21. The translational movement of the first gantry part 21 relative to the second gantry part 22 can be driven, for example, with electrical energy from the energy store ET of the supporting gantry part T when the rotor 24 rotates relative to the supporting gantry part T. The translational movement of the first gantry part 21 relative to the second gantry part 22 can be driven, for example, with electrical energy from the energy store ER of the rotor 24 when the rotor 24 is at rest relative to the supporting gantry part T.

The computed tomography device 1 shown in FIG. 8 is a mobile head computed tomography device. The gantry 20 comprises the head shell 19 and the body support device 7. A human head can rest on the head shell 19 while the human head is located in the opening 9 for head imaging. The body support device 7 can be used to support a shoulder area of the human while the head of the human is located in the opening 9 for head imaging and is resting on the head shell 19. The gantry 20 also has a casing V for delimiting an inner area of the gantry 20 from an environment L of the gantry 20. The computed tomography device 1 further comprises an operating system with a touch-sensitive screen 8 which is arranged on the gantry 20.

Figure 9:
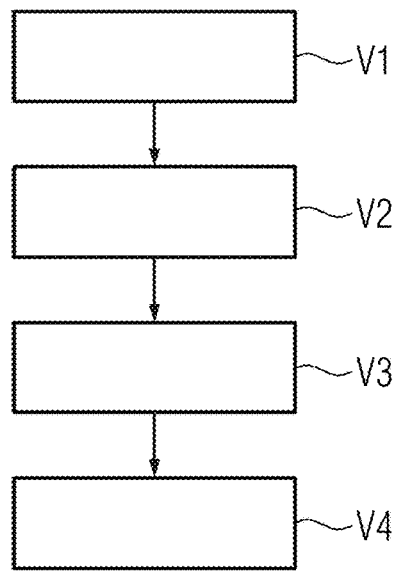
FIG. 9 shows a flow chart of a method for energy transmission in a computed tomography device.

FIG. 9 shows a flow chart of a method for energy transmission in a computed tomography device 1, the computed tomography device 1 comprising a gantry 20 with a supporting gantry part T, a rotor 24 and an energy transmission system C, the rotor 24 having the projection data acquisition system 27 and an energy store ER and being rotatably mounted relative to the supporting gantry part T, the method comprising:
 causing V1 an idle state of the rotor 24 relative to the supporting gantry part T in such a way that the rotor 24 is at rest relative to the supporting gantry part T,
 carrying out V2 energy transmission from the supporting gantry part T to the energy store ER of the rotor 24 via the energy transmission system C while the rotor 24 is at rest relative to the supporting gantry part T,
 rotating V3 the rotor 24 relative to the supporting gantry part T,
 supplying V4 the projection data acquisition system 27 with electrical energy from the energy store ER of the rotor 24 during rotation V3 of the rotor 24 relative to the supporting gantry part T.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

What is claimed is:

1. A computed tomography device, comprising:
a gantry with a supporting gantry part and a rotor, wherein
the rotor has a projection data acquisition system and an energy store configured to supply energy to the projection data acquisition system, and the rotor is rotatably mounted relative to the supporting gantry part,
the gantry has an energy transmission system
configured for energy transmission from the supporting gantry part to the energy store of the rotor,
the energy transmission system is configured for energy transmission from the energy store of the rotor to the supporting gantry part,
and
during the energy transmission from the supporting gantry part to the energy store of the rotor, the rotor is configured to be at rest relative to the supporting gantry part,
the supporting gantry part has an energy store, and
the energy transmission from the energy store of the rotor to the supporting gantry part takes place via the energy transmission system from the energy store of the rotor to the energy store of the supporting gantry part.

2. The computed tomography device as claimed in claim 1, wherein
during the energy transmission from the energy store of the rotor to the supporting gantry part, the rotor is configured to be at rest relative to the supporting gantry part.

3. The computed tomography device as claimed in claim 2, wherein
the energy transmission from the supporting gantry part to the energy store of the rotor takes place via the energy transmission system from the energy store of the supporting gantry part to the energy store of the rotor.

4. The computed tomography device as claimed in claim 2, wherein
the supporting gantry part has a first connecting element of the energy transmission system,
the rotor has a second connecting element of the energy transmission system,
the first connecting element and the second connecting element are aligned with to one another to establish an energy transmission connection, and
the first connecting element and the second connecting element are aligned with one another to establish the energy transmission connection when the rotor is in a coupling angular position relative to the supporting gantry part.

5. The computed tomography device as claimed in claim 2, wherein
the gantry has a chassis configured to move the gantry relative to a base area, and
the energy transmission from the energy store of the rotor to the supporting gantry part takes place during movement of the gantry.

6. The computed tomography device as claimed in claim 5, wherein
the supporting gantry part has an electric travel drive configured to interact with the chassis, and
the energy transmission from the energy store of the rotor to the supporting gantry part takes place via the energy transmission system from the energy store of the rotor to the electric travel drive to drive movement of the gantry via the electric travel drive.

7. The computed tomography device as claimed in claim 6, wherein
the energy transmission from the supporting gantry part to the energy store of the rotor takes place via the energy transmission system from the energy store of the supporting gantry part to the energy store of the rotor.

8. The computed tomography device as claimed in claim 1, wherein
the energy transmission from the supporting gantry part to the energy store of the rotor takes place via the energy transmission system from the energy store of the supporting gantry part to the energy store of the rotor.

9. The computed tomography device as claimed in claim 8, wherein
the supporting gantry part has a first connecting element of the energy transmission system,
the rotor has a second connecting element of the energy transmission system,
the first connecting element and the second connecting element are aligned with one another to establish an energy transmission connection, and
the first connecting element and the second connecting element are aligned with one another to establish the energy transmission connection when the rotor is in a coupling angular position relative to the supporting gantry part.

10. The computed tomography device as claimed in claim 1, wherein
the supporting gantry part has a first connecting element of the energy transmission system,
the rotor has a second connecting element of the energy transmission system,
the first connecting element and the second connecting element are aligned with one another to establish an energy transmission connection, and
the first connecting element and the second connecting element are aligned with one another to establish the energy transmission connection when the rotor is in a coupling angular position relative to the supporting gantry part.

11. The computed tomography device as claimed in claim 10, wherein the energy transmission connection is an electrical plug connecting the first connecting element and the second connecting element to one another.

12. The computed tomography device as claimed in claim 10, wherein the energy transmission connection is configured for contactless electrical energy transmission between the first connecting element and the second connecting element.

13. The computed tomography device as claimed in claim 10, wherein
the gantry has a coupling apparatus configured to
arrange the first connecting element and the second connecting element in a coupling position relative to one another, while the rotor is at rest relative to the supporting gantry part,
arrange the first connecting element and the second connecting element in a decoupling position relative to one another while the rotor is at rest relative to the supporting gantry part,
the energy transmission connection is established by coupling the first connecting element and the second connecting element to one another when the rotor is in the coupling angular position relative to the supporting gantry part and when the first connecting element and the second connecting element are arranged in the coupling position relative to one another, and
the energy transmission connection is interrupted by decoupling the first connecting element and the second connecting element from one another when the first connecting element and the second connecting element are arranged in the decoupling position relative to one another.

14. A method for energy transmission in a computed tomography device, wherein the computed tomography device has a gantry with a supporting gantry part, a rotor and an energy transmission system, wherein the rotor has a projection data acquisition system and an energy store and is rotatably mounted relative to the supporting gantry part, the supporting gantry part has an energy store, and wherein the method comprises:
causing an idle state of the rotor relative to the supporting gantry part such that the rotor is at rest relative to the supporting gantry part;
carrying out energy transmission from the supporting gantry part to the energy store of the rotor via the energy transmission system while the rotor is at rest relative to the supporting gantry part;
rotating the rotor relative to the supporting gantry part;
supplying the projection data acquisition system with electrical energy from the energy store of the rotor during rotation of the rotor relative to the supporting gantry part; and
carrying out energy transmission from the energy store of the rotor to the energy store of the supporting gantry part via the energy transmission system from the energy store of the rotor to the energy store of the supporting gantry part.

15. The method as claimed in claim 14, further comprising performing energy transmission from the energy store of the rotor to the supporting gantry part via the energy transmission system while the rotor is at rest relative to the supporting gantry part.

16. The method as claimed in claim 15, further comprising:
    moving the gantry relative to a base area via a chassis; and
    carrying out the energy transmission from the energy store of the rotor to the supporting gantry part during movement of the gantry.

17. The method as claimed in claim 16, wherein
    as a result of the energy transmission from the energy store of the rotor to the supporting gantry part via the energy transmission system, electrical energy for an electric travel drive configured to interact with the chassis is transmitted from the energy store of the rotor to the supporting gantry part, and
    movement of the gantry is driven via the electric travel drive based on the electrical energy for the electric travel drive.

18. The method as claimed in claim 14, wherein
    the supporting gantry part has a first connecting element of the energy transmission system,
    the rotor has a second connecting element of the energy transmission system,
    the first connecting element and the second connecting element are aligned with one another to establish an energy transmission connection, and
    the rotor is angularly positioned in a coupling angular position relative to the supporting gantry part such that the first connecting element and the second connecting element are aligned with one another to establish the energy transmission connection.

19. The method as claimed in claim 18, wherein
    the energy transmission connection is established by coupling the first connecting element and the second connecting element to one another by arranging the first connecting element and the second connecting element in a coupling position relative to one another while the rotor is at rest relative to the supporting gantry part and the rotor is in the coupling angular position relative to the supporting gantry part, and
    the energy transmission connection is interrupted by decoupling the first connecting element and the second connecting element from one another by arranging the first connecting element and the second connecting element in a decoupling position relative to one another while the rotor is at rest relative to the supporting gantry part and the rotor is in the coupling angular position relative to the supporting gantry part.

\* \* \* \* \*